(12) United States Patent
Sneddon

(10) Patent No.: US 6,831,125 B2
(45) Date of Patent: Dec. 14, 2004

(54) ADHESIVE OR PAINT COATING FOR TOY ARTICLES

(75) Inventor: John Sneddon, Santa Monica, CA (US)

(73) Assignee: Mattel, Inc., El Segundo, CA (US)

(*) Notice: Subject to any disclaimer, the term of this patent is extended or adjusted under 35 U.S.C. 154(b) by 95 days.

(21) Appl. No.: 10/300,461

(22) Filed: Nov. 19, 2002

(65) Prior Publication Data

US 2003/0065080 A1 Apr. 3, 2003

Related U.S. Application Data

(62) Division of application No. 09/729,071, filed on Dec. 4, 2000, now Pat. No. 6,503,569.

(51) Int. Cl.[7] .................................. C08K 5/03
(52) U.S. Cl. .................... 524/482; 524/481; 524/483
(58) Field of Search ............................. 524/481–483

(56) References Cited

U.S. PATENT DOCUMENTS

| | | | | | |
|---|---|---|---|---|---|
| 4,025,669 | A | * | 5/1977 | Greenstein | 427/226 |
| 4,833,193 | A | * | 5/1989 | Sieverding | 524/486 |
| 4,877,565 | A | * | 10/1989 | Tani et al. | 264/105 |
| 5,362,316 | A | | 11/1994 | Paradise | 106/278 |
| 5,417,747 | A | | 5/1995 | Arata et al. | 106/20 |
| 5,668,207 | A | | 9/1997 | Huang et al. | 524/483 |
| 5,824,408 | A | * | 10/1998 | Kume et al. | 428/323 |
| 6,149,980 | A | * | 11/2000 | Behr et al. | 427/393.5 |
| 6,306,943 | B1 | * | 10/2001 | Henry | 524/484 |
| 6,465,558 | B2 | * | 10/2002 | Scheibelhoffer et al. | 524/483 |

* cited by examiner

*Primary Examiner*—Peter Szekely
(74) *Attorney, Agent, or Firm*—Robert W. Mulcahy

(57) ABSTRACT

The invention is directed to resin coating, adhesive, and cement compositions comprising styrenic copolymers and a terpene solvent. The compositions are particulary useful for toy article applications because of the use of safe, naturally occuring terpene solvents. These compositions form high adhesion bonding with molded elastomeric styrene copolymer surface substrates. The invention is also directed to a method of applying the instant coatings to substrate surfaces.

6 Claims, No Drawings

ADHESIVE OR PAINT COATING FOR TOY ARTICLES

This application is a Divisional Application of prior U.S. application Ser. No. 09/729,071 filed on Dec. 4, 2000 now U.S. Pat. No. 6,503,569.

TECHNICAL FIELD OF THE INVENTION

The present invention relates to a novel composition and process for applying a styrenic based adhesive, cement, coating, or paint to thermoplastic polymer surfaces, particularly to toy articles formed of elastomeric materials. Because the coating composition uses naturally occurring terpene solvents, it is safe for use as a coating or paint for toy articles which can be safely used by children.

BACKGROUND OF THE INVENTION

Children's toys and dolls, in particular, have a history dating back into antiquity. Generally, the technology surrounding the manufacture of dolls centers on creation of an attractive doll face, miniturized application of conventional clothes, manufacture of a doll body using plush or other sculptural techniques, and the simulation of the hair with sculptural elements, fibers, or other techniques. In the case of doll faces, the doll maker has a wide panoply of possible constructions and manufacturing techniques at his disposal. Traditional techniques involve the use of plaster-like or hard plastics material to cast a doll face. In time, however, soft rubber materials such as styrene-butadiene rubber (SBR) and styrene-butadiene-styrene block copolymer (Kraton) elastomers have come to replace plaster and hard plastics in the production of doll heads because of their realistic look and feel.

The soft rubber doll faces include all the normal features of a human figure simulated by the doll including the entire head, including well formed lips, teeth, cheeks, nose, chin, ears, and forehead. After the injection molding of an elastomeric doll face, it is finished by applying a dye or other similar material to give the face a natural skin color. Parts of the facial skin are often given a contrasting reddish color to improve the attractiveness of the face, as by using an air brush may be used to apply a patch of rosy hue to the cheeks.

Regardless of the type of paint used on a toy doll article, it has remained imperative that such materials be safe for young children. Safety requirements have evolved through the years as safety concerns have grown. Generally, safety requirements mandate that any material compositions used in a toy be odorless, nonirritating to the skin or eyes or the like, and be nontoxic if ingested. Additional requirements have been expected of materials used to coat or paint toy articles in that they must be non-peeling, requiring that the coating or paint tenaciously adhere to the toy item to avoid flaking or peeling and possible consumption by a child user. Accordingly, such paints should be resistant to oxidation and flaking, particularly as applied to elastomeric rubber surfaces of soft doll faces. And further the paint should be able to withstand the stretching and other physical abuse of a child so that the appearance of the painted surface is maintained. And above all the paint or coating composition must avoid the use of undesirable volatile organic solvents the residual presence of which can be dangerous due to the toxic effect of certain aromatic and chlorinated hydrocarbon solvents.

In view of the environmental, health and safety concerns in the use of organic solvents, less controversial solvents such as water or mineral spirits have been used to provide toy paint or coating compositions. The mineral spirits is less toxic and considered generally safe in coating applications for toys and, of course, water is completely safe and non odiferous as a coating solvent for any coating applications. However both solvents evaporate relatively slowly over a long period of time which detracts from the overall effectiveness of these coating compositions. For example, when applying a water based latex emulsion paint to a soft elastomeric item, a slower evaporation time delays set up of the paint coating composition and inhibits complete bonding between the joined surfaces of the applied coat and the article. As a result of an extended drying period, non-uniform and unstable coatings result leaving these coating vulnerable to use factors which generate peeling and splitting among other negative consequnces.

As indicated above, the class of the styrenic elastomeric materials commonly used to mold doll faces and other toy articles are A-B-A type block polymers such as styrene-butadiene-butylene copolymer-styrene or styrene-butadiene-styrene, manufactured by Shell and sold under the trademark Kraton. The molded polymeric doll faces tend to be dull and unattractive and so are finished by application of a skin coating or paint to provide a good facial appearance to this facial piece. It has now been found that an elastomeric adhesive coating comprising a styrene based resin and a terpene solvent has particular advantages in forming tenaciously bonded adhesive coatings on styrenic resin molded items.

SUMMARY OF THE INVENTION

In accordance with the present invention, there is provided a resin coating composition particulary useful for toy article applications comprising a styrenic copolymer and a terpene solvent. The terpenes are naturally occuring, biodegradable compounds characterized by a very low level release of organic vapor and, accordingly, they are considered safe as solvents for coating or paint applications for toy items. The terpene solvents have also been found particularly effective in solubilizing styrenic copolymers and enhancing the bonding of the copolymers to form adhesive coatings on resinous substrate surfaces. Therefore compositions made in accordance with the present invention are completely non-toxic, environmentally and child safe, and result in an overall superior coating or paint product.

Of particular significance, styrenic copolymer/terpene coating compositions made in accordance with the present invention preliminarily dry in a rapid manner to provide a strong bond with polymeric substrate surfaces thereby engendering consequent use durability to the applied coat or film. The terpene solvent has been found capable of completely solubilizing styrene based resins, styrenic copolymers, pigments or other additives to provide a coating composition having a relatively high solids content up to 20% by weight of the total composition. Therefore while the resinous coating compositions made in accordance with the present invention can be viscous, they can be formulated to be poured and applied by hand, brush or other manipulative means for uniform coating application at ambient temperatures, while comprising a sufficient percentage of solids to avoid shrinkage following evaporation of the solvent.

The discovery of the present invention is that one may formulate a superior adhesive, cement, coating or paint composition by combining a styrenic copolymer and a terpene solvent in certain amounts to form a coating composition of completely unexpected character when applied to elastomeric substrate surfaces. While the coating composition is effective with any thermoplastic resin surface, the instant compositions are especially effective as a coating or adhesive for styrene based elastomers, those copolymers with a linear A-B-A configuration in which A is a polystyrene endblock. It is believed that the terpene solvent is particularly effective in solubilizing the styrene-based copolymer molecules of the substrate surface thereby takifying the elastomeric surface to generate a miscible interface with the applied coat resulting in an amalgam like bonding upon drying. The terpene solvent has been particularly effective with styrene based elastomeric copolymer surfaces having unsaturated block segments such as styrene-ethylene-butylene-styrene (SEBS) surfaces. Consequently the resulting coating is characterized by an exceptional durability, elongation and flexibility. Because the coating compositon employs certain naturally occuring terpene solvents, they are safe for use as paints for children's toys and are particularly useful in applications to the soft elastomeric materials used in doll facial structures where the paint coatings are expected to withstand the rigorous and hostile environment of child use.

The present invention is more particularly directed to a protective or adhesive coating for elastomeric substrates comprising from about 0.1% to 20% by weight of a styrenic copolymer resin and from 80% up to 99.9 weight % of a terpene solvent. A preferred protective or ornamental paint coating composition comprises from about 0.5% to 5% of a styrenic resin selected from the group of styrene butadiene rubber (SBR), styrene-butadiene-styrene (S-B-S), and styrene-ethylene-butylene styrene SEBS elastomeric block copolymers and from 95 to 99.5 wt. % of a terpene solvent. The preferred terpene solvents in the instant coating compositions include a monoterpene or sesquiterpene. This coating composition is found very effective in application to styrenic surface subtrates and particularly, styrene-ethylene-butylene-styrene elastomeric copolymer surfaces. An application of the subject protective or adhesive coating include the steps of (i) providing an elastomeric resin substrate; (ii) applying a composition comprising from about 0.1% to 20.0% by weight of a styrenic copolymer resin and from 80.0% to 99.9 wt. % of a terpene solvent to the elastomeric substrate; and (iii) curing the applied composition to form a layer on the elastomeric substrate.

In yet another embodiment, the instant composition can be formulated as an adhsive or cement to act as a glue when applied to a styrenic elastomeric substrate. A cement, glue, or adhesive compositon comprises from about 5% to 10.0 wt % of the styrenic resin and from 90% to 95 wt % of the terpene solvent. The application of this glue composition include the steps of (i) providing an elastomeric resin substrate surface; (ii) contacting the surface with an effective amount of a composition comprising from about 5% to 10.0% by weight of a styrenic copolymer resin and from 90.0 to 95 wt. % of a terpene solvent; and (iii) curing the applied composition to form an adhesive layer on the elastomeric substrate. Any curing steps in the application of the coating compositions include any means (e.g. heating) for evaporating the terpene solvent or otherwise hardening an applied coating or film of the instant formulation to form a hardened or solid layer on a substrate surface.

The coatings and adhesive compositions herein are characterized by viscosities approaching that of ordinary paint or the more viscous glue formulations. A dried coat of the instant formulations have elongation values and adhesion characteristics conforming to the quality and safety standards necessary for application to toy products. In addition, these coatings or adhesives have ultimate tensile values of greater than about 500 psi indicating that toughness is not being sacrificed to flexibility. It is important that coatings or adhesives used for application to toy articles, such as a soft elastomeric doll facial element, have high tensile strength so that the coated or painted article have child use durability especially as to stretchability. The instant coating and adhesive compositions have flexibility at both ambient and cold temperatures.

Paint application equipment constrains good application of coatings with viscosities that are greater than average paint and surface coating formulations and accordingly the viscosity of the instant compositions for a paint or film coating application have to be controlled by keeping a proper ratio of styrenic resin to terpene solvent. Stringing, nozzle clogging, and inconsistent or poor coating application occurs at high viscosities. A combination of high percent elongation, high adhesion, and low modulus in the instant compositions are shown to have good correlation with excellent lay flat characteristics in a finish coated elastomeric article. The resultant properties of the instant coating and adhesive compositions make them ideally suited for toy paint applications especially where good lay flat character is required.

DETAILED DESCRIPTION OF THE INVENTION

The present composition is the combination of two key ingredients, the styrene based copolymer and the terpene solvent, which synergistically provide for the desirable properties of the instant invention recited above. The instant styrenic based coating composition is characterized by the presence of a terpene solvent that is capable of solubilizing resinous components, particularly styrenic copolymers, to provide a uniform composition for application to elastomeric at ambient temperatures. Terpene compounds that are suitable for this purpose include but are not limited to monoterpenes and sesquiterpene; the monoterpenes include pinashe, both the alpha and beta isomers; gamma terpinene; delta-3-carene; limonene, both the l and d isomers; methadiene; and dipentene (the racemic mixture of the isomers of optically active limonene). A sesquiterpene compound used in the present invention is the general name for the compound having the formula $C_{15}H_{24}$. Examples of the sesquiterpene compound include cadinenes, caryophyllene, copaene, alpha-farnesene, humulene, longifolene, thujopsene and ylangene.

Preferred monoterpene and sesquiterpene solvents include d-limonene, l-limonene, dl-limonene, dipentene, terpineol, sesquiterpene, natural extracts such as lemon oil and orange oil containing the above-mentioned terpenes or mixtures thereof. Limonene is a natural product found in various ethereal oils such as oils of lemon, orange, caraway, dill and bergamot and which possesses a citrus-like odor and is found in commercial quantities in citrus fruits. Dipentene is found in large quantities in pine trees and has a distinct pine scent. Among all the listed terpenes, limonene in all forms is preferably used because it has a pleasant mild citrus scent, is color free and is found to enhance the coloring of paint coatings. Optimum coating composition results have been achieved with the isomer d-limonene. Terpene solvents in the practice of the present invention are available commercially from Arizona Chemical Company of Panama City, Fla. under the trademark ACINTENE "LS" series. The terpene may be combined or blended with other safe solvents, such as mineral spirits, to lower the overall solvent emmision or scent character of the composition and to facilitate early set up or curing following application of the coating or adhesive composition. Additionally, any other additive may be used to render the particular terpene satisfactory for use in a particular application. For example, deoderizing or perfuming agents can be used to temper the scent of odiferous terpenes such as pine scented dipentene and render the terpene as usable for toy coating application.

The total amount of solvent provided in the subject coating and adhesive compositions will vary depending on the character of the composition prepared, but will generally range from about 80.0% to 99.9 wt %, but preferably from about 90 to 99 wt % in the case of an adhesive or coating application contemplated herein. For application of a lay flat coating the terpene solvent is preferably present in an amount of from 95% to 99% by weight and as an adhesive or cement application the solvent is present in amounts of from 90.0% to 95% by weight of the total composition. The remainder of the composition comprises a styrenic resinous component in amounts ranging form about 0.1% to 20.0% by weight and preferably ranging from about 1% to 10.0% by weight of the total styrenic resin/terpene solvent composition. As indicated above, optional fillers, gellants, surfactants, pigments, dyes, perfuming agents and other additives may be included.

The resinous component of the present composition is a styrene based thermoplastic elastomer which include blends prepared by the copolymerization of one or more conjugated dienes, such as butadiene, isoprene, and chloroprene with styrene. Useful blends in the preparation of the instant coating and adhesive compositions include styrene butadiene rubber (SBR) and styrene-butadiene-styrene block copolymer. Styrene-based thermoplastic elastomers comprise blocks of hard segments, e.g., polystyrene, and blocks of soft segments, e.g., polyisoprene, polybutadiene, poly(ethylene-propylene), poly(ethylene-butylene), and polypropylene. Thus, useful styrene-based elastomers may comprise, for example, blocks of polystyrene and blocks of polyisoprene, or blocks of polystyrene and blocks of polybutadiene, of blocks of polystyrene and blocks of poly(ethylene-butylene). Examples of styrene based thermoelastic elastomers useful in the present composition, include styrene-ethylene-butylene-styrene block coplymers (e.g. KRATON G-1650, G-1651, G-1652, and G-1657) and styrene-ethylene-propylene block copolymers (e.g. KRATON G-1701, G-1702 and G-1762X), all commercially available from Shell Chemical Company. Combinations of these block copolymers can also be included. Styrene-ethylene-butylene-styrene (SEBS) copolymers are particularly effective because they have superior physical properties manifested in the coatings of the present invention, including durability in that it can withstand prolonged wear and tear in the form of impact resistance and flexibility. Again, the amount of thermoplastic elastomer useful in the present coating and adhesive compositions to achieve the desired characteristics is from about 0.1% to 20 wt % based on the total weight of the styrenic copolymer/terpene solvent composition. The compositional weights recited herein are based on the resin/solvent composition and inclusion of any additives will accordingly affect the overall compositional weight but the ratio of styrenic resin to terpene solvent will remain the same as initially formulated; that is, a 5% by weight styrenic resin in 95 wt % d-limonene will remain in the same ration to one another even with the addition of dye or pigment.

It is to be emphasized that the purview of the compositional invention herein is the combination of a styrene based thermoplastic polymer and a terpene solvent in certain amounts for adhesion or paint application to elastomeric substrate surfaces. As indicated above, especially effective elastomers are styrene-ethylene-butylene-styrene (SEBS) copolymers which are solvated very effectively with a terpene such as d-limonene, the compatibility between the polymer and terpene solvent being speculated as being due to the mutual unsaturation in the terpene and the ethylene-butylene segment of the styrenic polymer. The particular compatibility of the terpene and and the SEBS polymer in the coating composition follows on through application to a solid molded or otherwise formed SEBS substrate surface, which acts as an optimal substrate surface for application of the SEBS/terpene (d-limonene) adhesive or paint coating composition. Accordingly, the most preferred embodiment of this invention is an application of an SEBS/terpene coating to a solid molded SEBS substrate surface.

The instant coating may be applied as a paint and accordingly the composition would contain a pigment, dye, or colorant in amounts of up to 3% by weight in addition to the thermoplastic elastomeric resin and terpene solvent. The pigment used herein is not particularly limited and various inorganic or organic pigments can be employed. Concrete examples of pigments and colorants are: synthetic organic colorants sold as the T-series by the Day Glow Corporation of South Gate City, Calif. Other pigments which can be used include sodium aluminum sulpho silicate sold as MR 582 by the Cleveland Pigment Corp. of Cleveland, Ohio; polyamide condensates with organic dyes with less than 2% phthalocyanine; and tetra-chloro-zincate sold by the Day Glow Corporation.

In reinforcement of the additives mentioned above, compositions made in accordance with the present invention may additionally employ gelling and thickening agents such as ethylene glycol and clay mixtures to provide the desired texture and body for ease of application of the instant coating compositions. In certain coating applications, fillers and stabilizers such as organic and inorganic fibers, sand, talc and mixtures thereof may also be included as part of the coating composition. Compositions of the present invention can be applied by any means such as with a brush, a cloth, or a spray applicator. The surface of a polymeric substrate surface should be clean and dry before application of the instant coating. Once applied the compositions should be allowed a period of at least 30 minutes to allow curing of the composition by drying of the terpene solvent.

Having generally described the present invention, the following examples are set for the below to further demonstrate compositions embodying the present invention. The compositions of the present invention are prepared by adding the specified amount of styrenic resin to the stated amount of terpene solvent under agitaiton. Specified amounts of other ingredients are added where indicated. In the following Example 1, the applied paint composition is subjected to an Eraser Abrasion Test, a Surface Coating Adhesion (Tape Pull) Test, and Stretch Tests to determine the adhesion and stretch characteristics of the present styrenic copolymer/terpene coating composition. These tests are carried out employing standard Quality and Safety Operating Procedures of the Assignee of the present application, Mattel, Inc.

EXAMPLE 1

4 percent by weight of a styrene-ethylene-butylene-styrene (SEBS) copolymer elatomer known as Kraton 1651 is dissolved in a 96 percent by weight of the terpene d-Limonene in a flask. After complete disolution of the styrenic elastomer the viscosity of the solution being slighly greater than water. 1% by weight of a red pigment was added to the paint coating solution with stirring continued until dispersion of the pigment and generation of a red color to the coating (paint) composition. A molded soft elastomeric doll face comprised of a solid molded SEBS elastomeric copolymer was provided and the paint composition applied to the cheek and lip areas of the molded doll face. The rubbery painted doll facial item was allowed to dry for one hour. Thereafter the soft painted rubbery painted doll face was subjected to 1600% Elongation Test and an Eraser Abrasion Test. The tests revealed that the paint coating did not split, peel, or abrade under the tests. The surface bonding between the applied coating and the surface substrate was so strong and uniform so as cause complete adhesion between the styrenic coating and the rubbery elastomeric substrate surface.

EXAMPLE 2

95 percent by weight of the same styrenic thermoplastic elastomer of Example 1 (Kraton 1651) was dissolved in a 4 percent by weight volume of the terpene d-Limonene in a wide mouth beaker. After complete disolution of the styrenic thermoplastic elastomer with difficult stirring the viscosity of the solution was approximate that of a thick glue. Thereafter a rubbery styrenic copolymer substrate surface is provided and a dab of the viscous elastomeric terpene solution is applied to the rubber surface and as separate piece of rubbery material patched onto the dabbed viscous area. After drying for an hour the patched rubber item was found glued tenaciously to the thermoplastic elastomeric substrate surface. Attempts at removal of the patch results in damage to the elastomeric substrate surface.

The adhesive and coating compositions of the present invention possess unique combinations of properties, including both a high degree of elastic durability under suddenly applied stresses, and a high degree of plasticity when the stress is applied more slowly. The miscible character of the styrenic polymer/terpene composition when applied to a molded polystyrene endblocked polymer substrate surface causes an anneal like bonding with that substrate surface so as to form a physically indistinguishable layer with that surface. Accordingly the well bonded compositional layer reacts to the physical stresses applied to the body of the substrate in exactly the same manner as the underlying substrate. Therefore the coating will stretch, strain, and impact as its substrate underlayer and shoe no splitting or peeling. Other properties include excellent stability throughout a very wide temperature range. Most importantly, the applied coatings of these novel compositions are nontoxic and, therefore, coated toy items are safe for use by children of all ages.

Having thus described the principals of the invention, together with illustrative embodiments thereof, it is to be understood that although specific terms are employed, they are used in a generic and descriptive sense and not for the purpose of limitation, the scope of the invention being set forth in the following claims.

What is claimed:

1. A coating composition for thermoplastic resin substrate surfaces comprising from about 0.5% to 5% by weight of a styrenic copolymer resin and from 95% to 99.5% by weight of a terpene solvent, wherein the terpene solvent is selected from the group consisting of d-limonene, 1 limonene, dl-limonene, dipentene, terpineol, sesquiterpene, natural extracts containing these terpenes, and mixtures thereof, and the styrenic copolymer resin is selected from the group consisting of styrene-butadiene rubber, styrene-butadiene-styrene block copolymers, styrene-ethylene-propylene-styrene block copolymers, styrene-ethylene-butylene-styrene block copolymers and mixtures thereof.

2. The coating composition of claim 1, (wherein the styrenic copolymer resin is a styrene-ethylene-butylene-styrene block copolymer.

3. The coating composition of claim 1 wherein the terpene solvent is d-limonene.

4. A coating composition for thermoplastic resin substrate surfaces comprising from about 5.0% to 10% by weight of a styrenic copolymer resin and from 90% to 95% by weight of a terpene solvent, wherein the terpene solvent is selected from the group consisting of d-limonene, 1 limonene, dl-limonene, dipentene, terpineol, sesquiterpene, natural extracts containing these terpenes, and mixtures thereof, and the styrenic copolymer resin is selected from the group consisting of styrene-butadiene rubber, styrene-butadiene-styrene block copolymers, styrene-ethylene-propylene-styrene block copolymers, styrene-ethylene-butylene-styrene block copolymers and mixtures thereof.

5. The coating composition of claim 4 wherein the styrenic copolymer resin in the coating composition is a styrene-ethylene-butylene-styrene block copolymer.

6. The coating composition of claim 4 wherein the terpene solvent is d-limonene.

* * * * *